United States Patent [19]
Skogby

[11] Patent Number: 6,142,682
[45] Date of Patent: Nov. 7, 2000

[54] SIMULATION OF COMPUTER PROCESSOR

[75] Inventor: Staffan Skogby, Danderyd, Sweden

[73] Assignee: Telefonaktiebolaget LM Ericsson

[21] Appl. No.: 08/874,660

[22] Filed: Jun. 13, 1997

[51] Int. Cl.[7] ................................................ G06F 9/455
[52] U.S. Cl. ................................ 395/500.47; 395/500.48
[58] Field of Search ........................... 395/500.47, 500.48

[56] References Cited

U.S. PATENT DOCUMENTS

| | | |
|---|---|---|
| 3,698,007 | 10/1972 | Malcolm et al. . |
| 4,031,517 | 6/1977 | Hirtle .................................. 395/500.44 |
| 4,794,522 | 12/1988 | Simpson ............................ 395/500.48 |
| 4,908,821 | 3/1990 | Sirato . |
| 5,101,491 | 3/1992 | Katzeff . |
| 5,233,628 | 8/1993 | Rappaport et al. . |
| 5,406,644 | 4/1995 | MacGregor . |
| 5,465,361 | 11/1995 | Hoenninger, III . |
| 5,488,569 | 1/1996 | Kaplan et al. . |
| 5,502,826 | 3/1996 | Vassiliadis et al. . |
| 5,572,710 | 11/1996 | Asano et al. ......................... 395/500.34 |
| 5,613,098 | 3/1997 | Landau et al. . |
| 5,621,670 | 4/1997 | Maeda et al. . |
| 5,669,000 | 9/1997 | Jessen et al. ......................... 395/500.48 |
| 5,684,721 | 11/1997 | Swoboda et al. ................... 395/500.34 |

FOREIGN PATENT DOCUMENTS

| | | |
|---|---|---|
| 88 07718 | 10/1988 | WIPO . |
| PCT/US94/ 03911 | 4/1994 | WIPO . |

OTHER PUBLICATIONS

May, "Mimic: A Fast System/370 Simulator", Proceedings of the Object Oriented Programming Systems Languages an Applications Conference, (OOPSLA), Orlando, Oct. 4–8, 1987, Special Issue of Sigplan Notices, vol. 22, No. 12, Dec. 1987, vol. 22, No. 7, Jun. 24.

*Primary Examiner*—Kevin J. Teska
*Assistant Examiner*—Kyle J. Choi
*Attorney, Agent, or Firm*—Nixon & Vanderhye, P.C.

[57] ABSTRACT

An instruction emulation system translates target instructions into emulation instructions for execution by a host processor. A jump table has pointer entries employed to locate, in a translation instruction memory, sets of translating instructions for generating emulation instructions executable by the host for each of the differing types of target instructions. In one embodiment, each of pointer entries in the jump table has an entry length which is no greater than the shortest target instruction length, thereby enabling the jump table to handle target instructions of non-uniform instruction length. For another embodiment in which the target instructions comprise blocks of target instructions, including signal-handling target instructions, the jump table is augmented by a jump table shadow memory which saves memory requirements for code complication. In another embodiment, the jump table memory is partitioned into segments corresponding to the blocks stored in the target instruction memory. Selected ones of the segments of the jump table memory are uncompacted in accordance with a recent utilization criteria and non-selected ones of the segments are compacted.

15 Claims, 10 Drawing Sheets

SIMULATION OF COMPUTER PROCESSOR

BACKGROUND

1. Field of Invention

This invention pertains to the simulation or emulation on a processor of a simulating computer system of programmed instructions prepared for a processor of a simulated computer system.

2. Related Art and Other Considerations

Computer systems have processors which recognize and execute coded instructions, e.g., software, in order to perform activities and thereby obtain desired results and/or outputs. To be executed by any particular processor, a coded instruction must be interpreted or otherwise reducible for expression as an instruction belonging to a predefined instruction set which is native to the processor.

Differing types of processors can (and typically do) have differing instruction sets. Yet, it is often necessary to execute instructions prepared or written for a first type of processor (herein referred to as the target processor) on a second type of processor (herein referred to as the host processor). That is, circumstances may require that instructions coded in accordance with an instruction set of the target processor be executed on the host processor, although the host processor utilizes a different instruction set than the target processor. Such can occur, for example, when it is necessary or desirable for the host processor to simulate or emulate the target processor, e.g., in order to test software written for the target processor.

When a host processor serves to emulate a target processor, the host processor stores the software written for the target processor (i.e., the target instructions) in a memory. The host processor executes an emulation program, which includes both a translation process and a translated-instruction execution process. In connection with the translation process, the emulation program decodes each target instruction to determine its type (e.g., an "add registers" instruction, a "move" instruction, etc.). For the translation process, the host processor has access elsewhere in memory to translation code. The translation code is written in accordance with the instruction set of the host processor. For each type of target instruction, the translation code includes a series of host instructions which enable the host processor to generate emulation code (in accordance with the host instruction set). The emulation code enables the host processor to perform equivalent actions as required by the target instruction.

In simulation/emulation situations such as that summarized above, it has been known to use a jump table. In essence, the jump table contains pointers to the series of host instructions in the translation code which generate the emulation code corresponding to the target instruction. That is, when the emulation program decodes a target instruction to determine its type, for that particular target instruction type the jump table has a pointer to the particular translation code which generates emulation code in terms of the host instruction set. Jump tables are described, e.g, in MacGregor's International Patent Application PCT/GB87/00202, "ARRANGEMENT FOR SOFTWARE EMULATION".

Jump tables can interject delay and increase memory requirements. Accordingly, avoiding jump tables is described in the prior art. See, for example, Davidian's International Patent Application PCT/US94/03911, "METHOD FOR DECODING GUEST INSTRUCTIONS FOR A HOST COMPUTER", which decodes guest instructions based on direct access to instructions in an emulation program.

Simulation and emulation are particularly important in modeling complex processing systems such as those employed in the telecommunications industry. Such processing system typically have an instruction processor which executes blocks of code. The blocks of code are stored in a memory known as the program store. The instruction processor must also be capable of handling signals. As used herein, a "signal" is a message sent from one block of code to another. The signal comprises both a signal header and a signal body. The signal header includes an identifier of the sending block and the recipient block, as well as a signal number or type. The signal body includes data which is to be utilized by the recipient block in the execution of the signal.

When such a processing system as described in the preceding paragraph is considered a target processor for emulation on a host processor, an efficient method is necessary for translating the blocks of code and the signals. Moreover, should the target processor utilize an instruction set having non-uniform instruction length, coordinating target instructions to jump table locations becomes problematic.

What is needed, therefore, and an object of the present invention, is an emulation/simulation system that is efficient, compact, and able to both handle signals and target instructions of non-uniform length.

SUMMARY

An instruction emulation system translates target instructions into emulation instructions for execution by a host processor. A jump table has pointer entries employed to locate, in a translation instruction memory, sets of translating instructions for generating emulation instructions executable by the host for each of the differing types of target instructions.

In one embodiment, each of pointer entries in the jump table has an entry length which is no greater than the shortest target instruction length, thereby enabling the jump table to handle target instructions of non-uniform instruction length.

For another embodiment in which the target instructions comprise blocks of target instructions, including signal-handling target instructions, the jump table is augmented by a jump table shadow memory. The jump table shadow memory has a plurality of jump table shadow tables, each jump table shadow table being paired with one of the plurality of blocks having a signal-handing target instruction. Each jump table shadow table has a copy of a jump table entry associated with the signal handling target instruction included the block with which the jump table entry table is paired. When compiling a designated block of target instructions, the host processor compiles a portion of the jump table which corresponds to the designated block and the jump table shadow table for any other block invoked by a signal generated by the designated block.

In another embodiment, the jump table memory is partitioned into segments corresponding to the blocks stored in the target instruction memory. Selected ones of the segments of the jump table memory are uncompacted in accordance with a recent utilization criteria and non-selected ones of the segments are compacted.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 8 is a diagrammatic view showing an interrelationship, according to the embodiment of FIG. 7, between a target object code area, a jump table, and a time stamp memory area.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
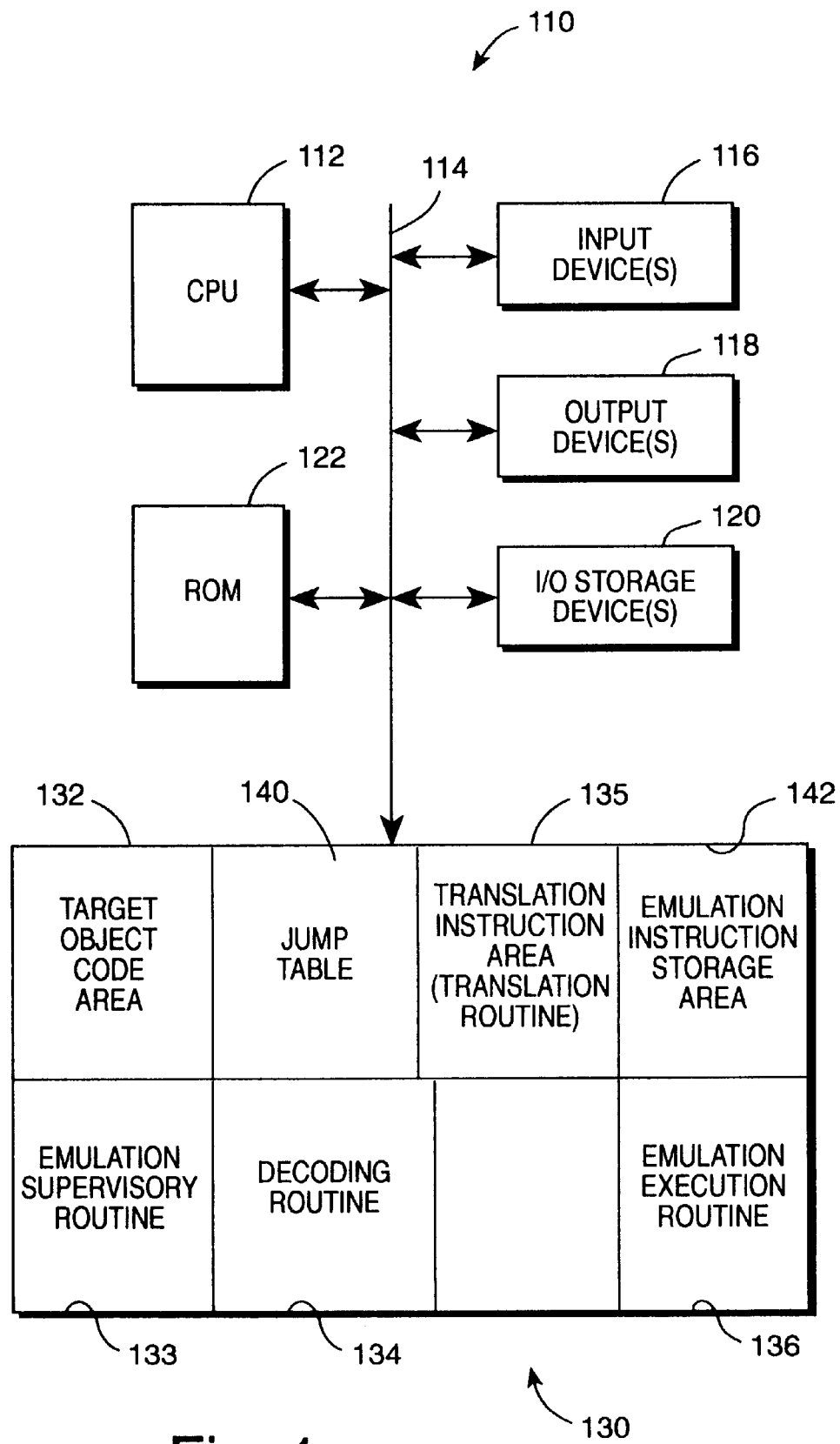
FIG. 1 is a schematic view of a host system which translates target instructions into emulation instructions and which executes the emulation instructions.

FIG. 1 shows a host computer system 110 which simulates or emulates an unillustrated target computer system. Host computer system 110 has a host processor, e.g., CPU 112, which communicates with other host constituent units over bus 114. The other host constituent units include input device(s) (e.g, keyboards and pointers [e.g., mouse]) 116; output device(s) (e.g., displays, printers) 118; input/output storage device(s) 120 (e.g., disk drives); read only memory (ROM) 122; and, random access memory (RAM) 130. The person skilled in the art understands that various ones of these constituent units are connected to bus 114 through appropriate interfaces. Host computer system 110 can be, for example, a SPARC workstation marketed by Sun Microsystems.

As schematically depicted in FIG. 1, RAM 130 includes a number of routines and area (e.g., sections or tables). For example, target object code area 132, also known as the target instruction memory, is used to store programmed instructions coded for the unillustrated target processor. The target instructions stored in target object code area 132 of RAM 130 are typically obtained from an external storage media (e.g., via I/O storage device 120) and transferred as necessary, e.g., cached, into RAM 130. By "coded for the unillustrated target processor" is meant that the target instructions are formatted in accordance with the instruction set of the target processor, e.g., the target instructions are written as assembly level instructions using the instruction set of the target processor. The target instructions stored in target object code area 132 are intended to cause the target processor to perform specified activities and/or obtain specified results. However, as hereinafter described, the target instructions stored in target object code area 132 are instead translated by host computer 110 into instructions which host computer 110 can understand for attempting to accomplish the same specified activities and/or obtain specified results.

Also included in RAM 130 are various programmed routines executed by host processor 112, including an emulation/simulation supervisory routine (ESR) 133; decoding routine 134; translation routine 135; and, emulation execution routine 136. In addition, RAM 130 has stored therein a jump table 140 and an emulation instruction storage area 142.

Figure 2:
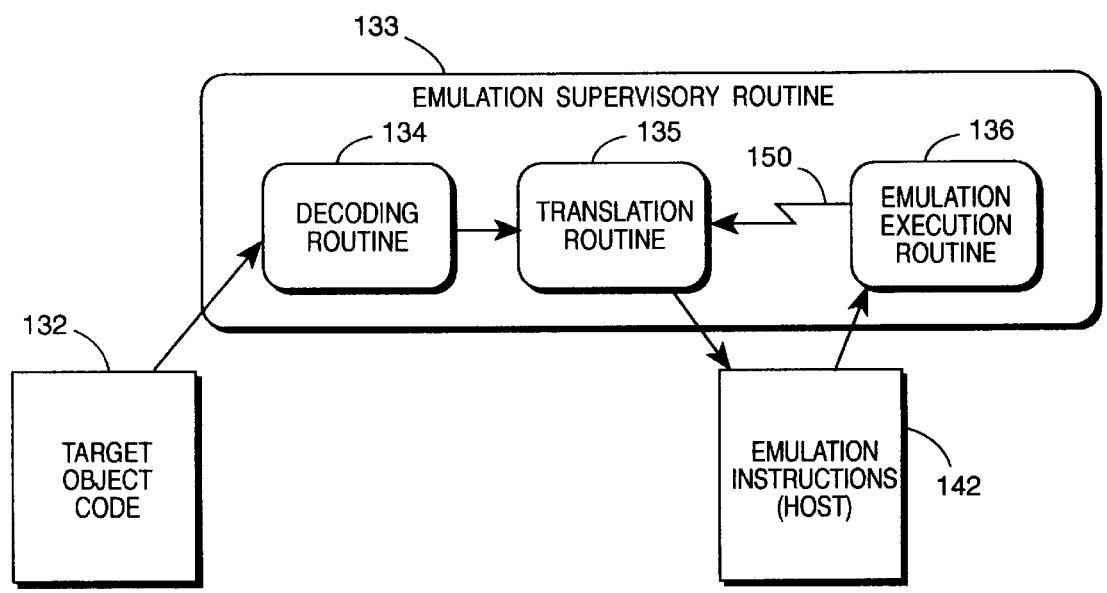
FIG. 2 is a diagrammatic view showing pipelined coordination by a emulation supervisory routine of translation of target object code to emulated instructions and of execution of the emulated instructions.

FIG. 2 shows how emulation supervisory routine coordinates pipelined performance of translation of target object code to emulated instructions and execution by the host of the emulated instructions. In brief, when emulation supervisory routine 133 determines that it is time to fetch target instructions from target object code area 132, the fetched target instructions are analyzed by decoding routine 134. Decoding routine 134, knowing the structure of the target instruction set, picks apart a fetched target instruction and determines its type, e.g., whether the fetched instruction is an "add register" instruction for adding the contents of two registers, a "move" instruction for moving the contents of one register into another register or address, etc. The analysis of the fetched target instruction is premised upon understanding by decoding routine 134 of the predefined operation codes and fields of the target instruction sets. With the benefit of the analysis performed by decoding routine 134, translation routine 135 builds a set of emulation instructions for storage in emulation instruction area 142. The emulation instructions stored in area 142 are formatted in the instruction set of host processor 112. The emulation instructions generated for the fetched target instruction are configured to cause host processor 112 to perform the same actions as would the target processor upon executing the fetched target instruction. Emulation execution routine 136 obtains the emulation instructions from area 142 for execution by host processor 112. When emulation execution routine 136 determines that more emulation instructions are necessary for filling in emulation instruction storage area 142, an interrupt is generated to translation routine 135 as shown by line 150 in FIG. 2. In response to the interrupt, more target instructions are fetched, decoded, and translated for supply to emulation instruction storage area 142.

An important aspect of the present invention is the translation of fetched target object code into emulation instructions which are executable by host processor 112. To this end, more detailed discussion is provided below pertaining to modes of the translation, including configurations and usages of jump table 140.

Figure 3:
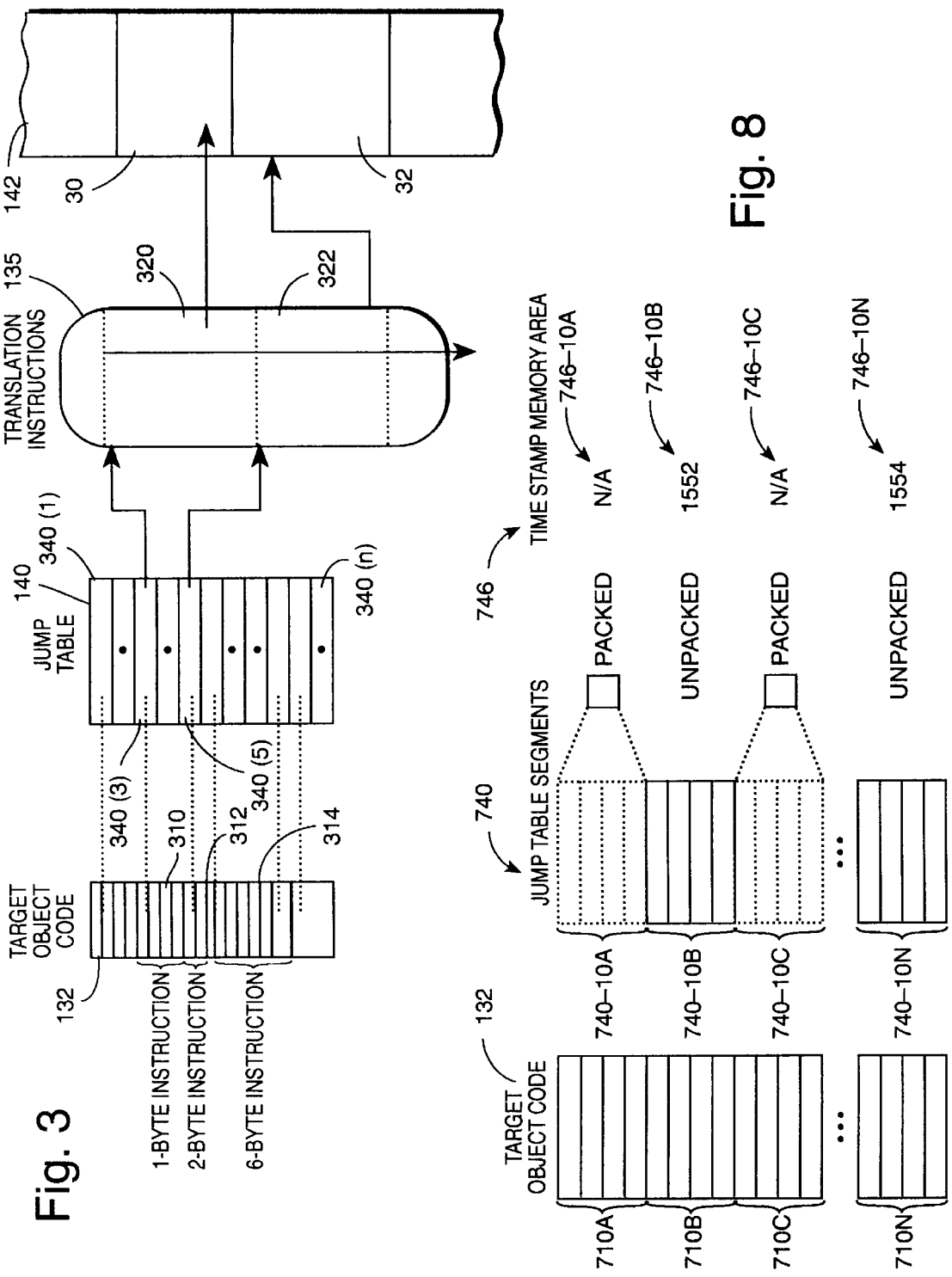
FIG. 3 is a diagrammatic view showing an interrelationship, according to one mode of the invention, between a target object code area, a jump table, and translation instruction area in which a translation routine resides.

FIG. 3 shows an interrelationship, according to one mode of the invention, between target object code area 132, jump table 140; and translation instruction area 135 in which the translation routine resides. As indicated in FIG. 3, the target instructions stored in target object code area 132 having differing instruction lengths. For example, target instruction 310 is a four byte instruction, target instruction 312 is a two byte instruction, and target instruction 314 is a four byte instruction. Thus, in the illustrated embodiment, the shortest target instruction length is two bytes.

Each target instruction stored in target object code area 132 must be translated into instructions, known as emulation instructions, which are executable by host processor 112 so that host processor 112 will perform the same action as would the target processor upon execution of the target instruction. To this end, translation routine 135 includes, for each type of target instruction, a set of translating instructions for generating emulation instructions. For example, translation routine 135 includes a set 320 of translation instructions which are suitable for building a set 330 of emulation instructions in accordance with the target instruction type to which target instruction 310 belongs. As another example, translation routine 135 includes a set 322 of translation instructions which are suitable for building a set 332 of emulation instructions in accordance with the target instruction type to which target instruction 312 belongs.

In the course of instruction translation it is necessary to locate, in translation instruction area 135, the particular set (e.g., set 320 or 322) of translation instructions suitable for building the emulation instructions for storage in emulation instruction storage area 142. To this end jump table 140 is employed. As shown in FIG. 3, jump table 140 has a plurality of slots or entries 340(1) through 340(n). Each entry 340 in jump table 140 has a length SL which is no greater than the shortest target instruction length, i.e., two bytes in the illustrated embodiment.

Upon fetching and decoding by decoding routine 134, each target instruction in target object code area 132 is assigned a pointer to the set of translation instructions in area 135 which can be utilized to build a corresponding set of emulation instructions. For example, entry 340(3) contains a pointer for target instruction 310, the pointer of entry 340(3) referencing the address of set 320 of translation instructions in area 135. Similarly entry 340(5) contains a pointer for target instruction 312, the pointer of entry 340(5) referencing the address of set 332 of translation instructions in area 135. Each pointer is stored in a unique location in jump table 140. In fact, jump table 140 and target object code area 132 are so configured and addressed that the address of the target instruction in the target object code area 132 can be used to obtain the address of the corresponding pointer in jump table 140. In particular, the byte address following the target instruction in the target object code area 132, when divided by the standard length SL of the entries in jump table 140, yields the entry number of the corresponding pointer in jump table 140. For example, in the illustrated embodiment, the pointer for target instruction 312 (which ends at address 10 of area 132), is stored at entry 10/SL=10/2=5 of jump table 140.

Thus, the structure of jump table 140 of the embodiment of FIG. 3 facilitates utilization of target instructions of variable, i.e., non-uniform length, and yet maintains an efficient indexing scheme for locating pointer entries in jump table 140 for the target instructions. Such is accomplished by providing jump table 140 with a granularity which is the same as the length of the shortest target instruction. However, each entry in jump table 140 still needs to be sufficiently long so that it can contain the address of the set of translation instructions in area 135 to which it points. Thus, jump table 140 must be twice as large as the target program whose target instructions are stored in target object code area 132. For some applications, the size of jump table 140 would then become unacceptably large, inviting one or more mechanisms as described below for reducing the size of jump table 140.

Figure 9A:
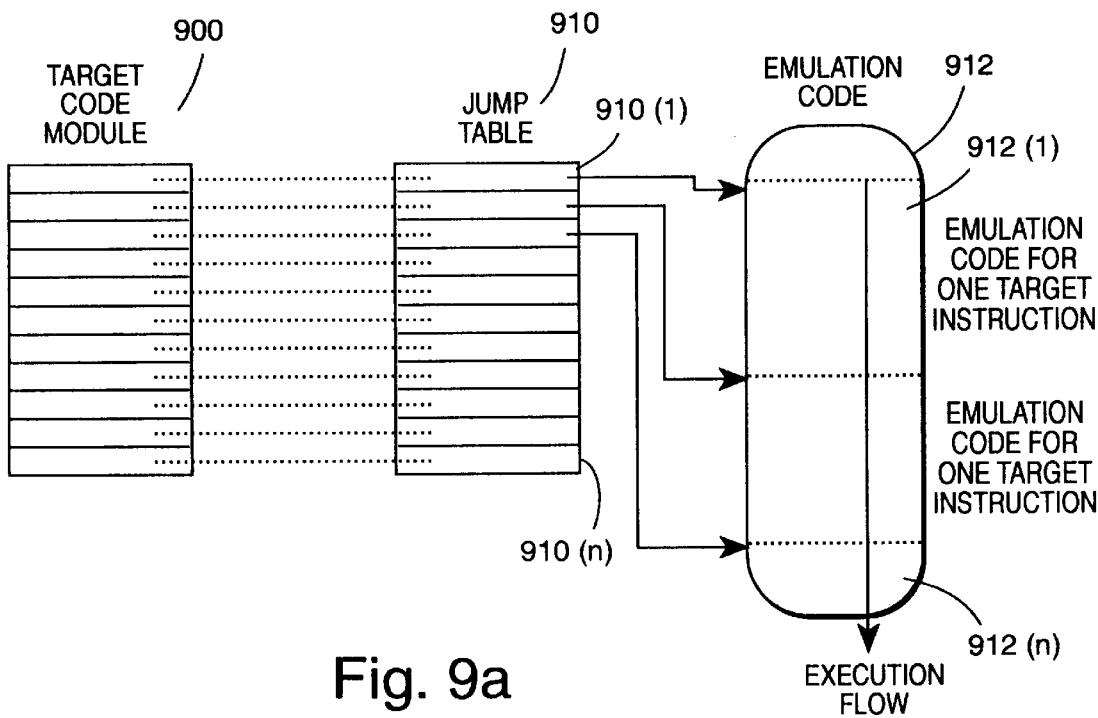
FIG. 9a is a diagrammatic view showing an interrelationships, according to one mode of the invention, between a target code module, a jump table and an emulation code area.

FIG. 9a illustrates the hybrid model aspects of one embodiment of the invention. The model of FIG. 9a merges the advantages of a common execution thread model with the advantages of an in-line model. Specifically, the hybrid model achieves the fast calculation of jump destinations and the efficient handling of program counter calculation from target to host code that are provided by pure thread models. The hybrid model also achieves the speed advantage provided by a pure in-line model.

The hybrid system of FIG. 9a achieves these advantages with the target code module 900 interacting with the emulation code area 912 via the jump table 910 having associated jump table pointers 910(1) through 910(n). The target processor instructions are translated into the emulation code dynamically, "on the fly." But the translation is done for blocks of target instructions which will be consecutively executable without any jumps. In this way, the host computer can execute code in a straight flow without undue pipeline breaks.

The emulation code 912 is then executed consecutively, in-line, as shown in FIG. 9a. This means that the emulation code can be executed without the usual linkage instructions between the blocks of emulation code 912(1) through 912(n). This ensures that the host computer can execute the emulation code quickly, without breaking the pipeline of executable emulation instructions, except for situations such as address translations, interrupts or breakpoints.

Figure 9B:
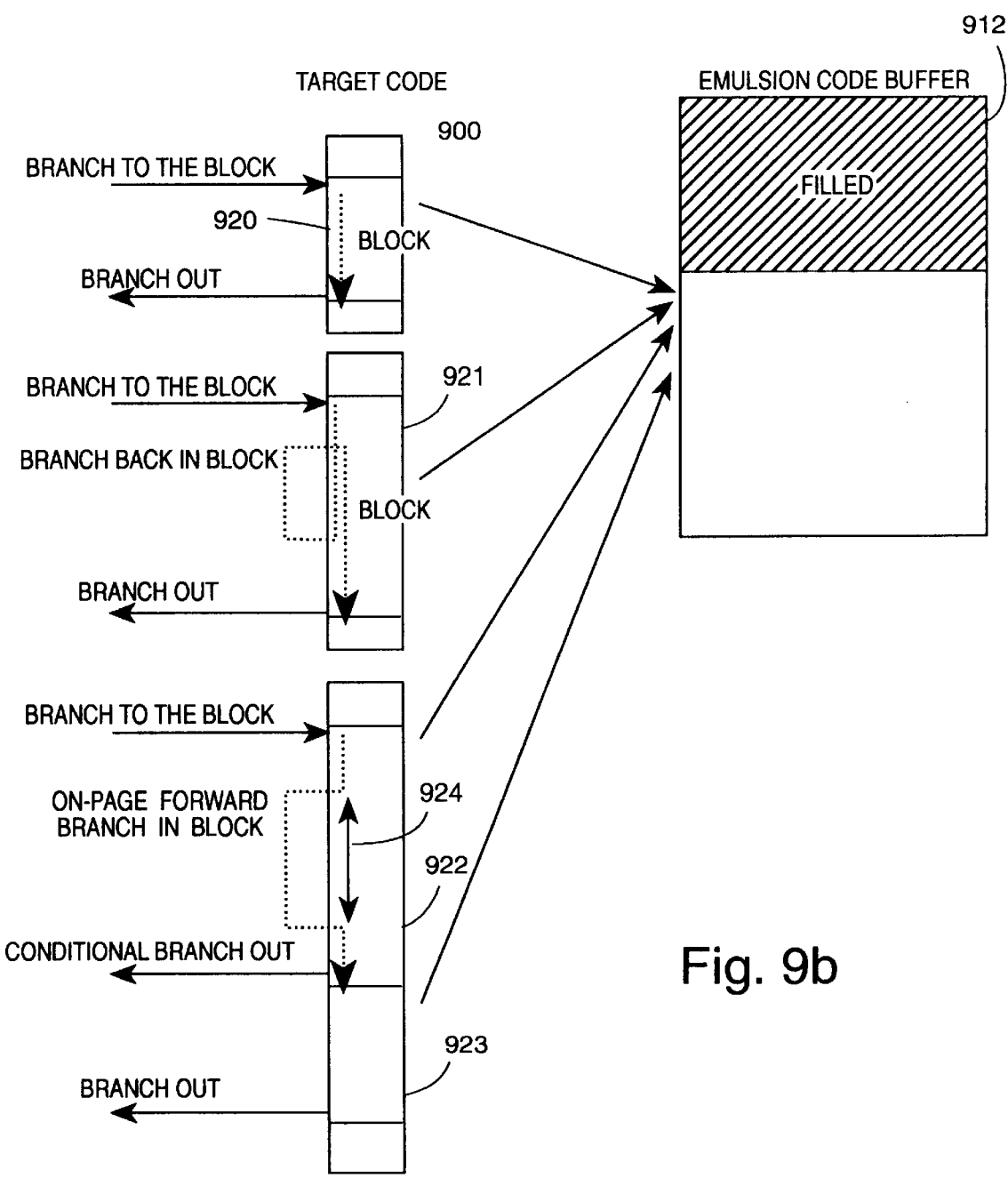
FIG. 9b is a diagrammatic view showing the organization of in-line emulation code.

As illustrated in FIG. 9b, consecutive host code emulation blocks are collapsed into in-lined blocks to save linkage instructions. In the example embodiment of FIG. 9b, the boundaries for each compilation block can be determined by examining the flow-control instructions. Incremental compilation is started when execution reaches a non-compiled target instruction, which typically happens when branching. The block is compiled until a branch is reached and is stopped at a branch inside the block. This generation results in an emulation code block that starts and stops at branch destinations.

The example rules for compiling the block selections in FIG. 9b are:

1. The first instruction at a branch destination starts a block, unless the instruction is already compiled.
2. The block continues until the first branch instruction is reached, except for the following cases:
   2.1 If the branch is backwards into the current block, the block is not stopped and compilation continues.
   2.2 A local (e.g., less than the page size) forward branch does not stop the block unless there is another branch between the forward branch and the destination of the forward branch that does not apply to rule 2.1 and 2.2
3. The first instruction after a conditional branch also starts a block.

These rules can be simplified to the following without loss of efficiency in practice:
1. The first instruction at a branch destination starts a block, unless the instruction is already compiled.
2. The block continues until the first non-conditional branch instruction.

In FIG. 9b, for example, the first instruction at the branch starts executable block 920 and the first non-conditional branch instruction ends it. Based on these two branches, block 920 is defined and stored in emulation code buffer 912. The next block 921 begins at the first branch and continues to the indicated "branch out." Note, in block 921 the intermediary "branch back" does not end block 921 since this "branch back" branches backward but also into the current block and thus can be executable in the emulation code without external jumps or a break in the pipeline. The "branch back" of block 921 thus follows rule 2.1 above by not ending the block 921.

Block 922 of FIG. 9b begins at the "branch in" and ends at the conditional "branch out" in accordance with rule 3 above. Between these branches, block 922 includes a short "branch forward" which does not end the block 922 due to its relative size, as listed in rule 2.2. Note that this rule may lead to compilation of code 924 that is not executed following the branch forward instruction up to the point where the branch forward returns to the instruction set. Also, "conditional branch" ends and begins blocks 922 and 923 in accordance with rule 3.

Figure 4:
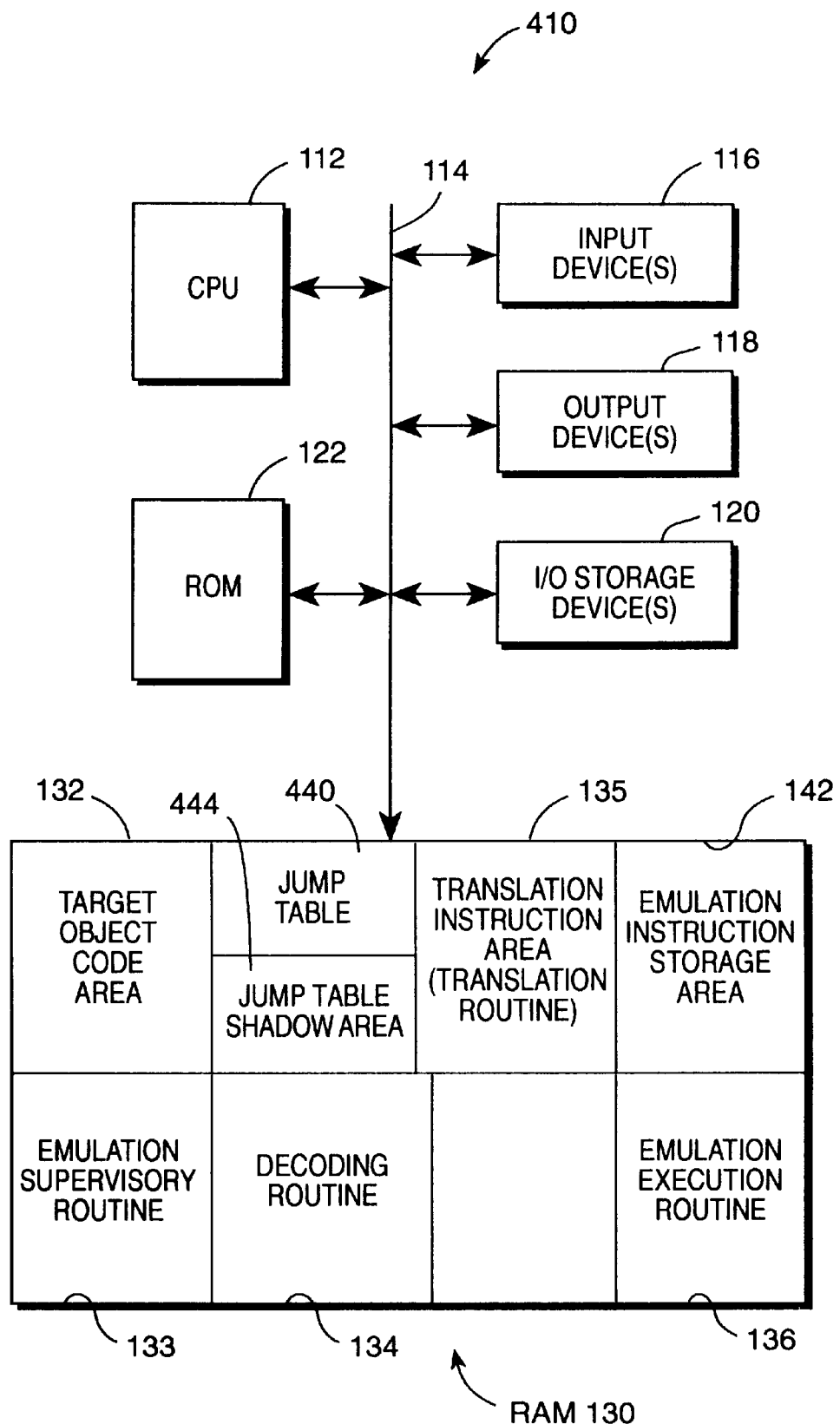
FIG. 4 is a schematic view of another embodiment of a host system according to the present invention, which embodiment reduces size of a jump table by the provision of jump table shadow tables.

Host system 410 of FIG. 4 achieves a small number of entries in its jump table 440. Host system 410 of FIG. 4 resembles host system 110 above described with respect to FIG. 1, except as otherwise noted herein, e.g., by differently referenced constituent elements. One primary difference between host system 410 and host system 110 is the provision in RAM 130 of host system 410 of a jump table shadow area 444. The utilization of jump table 440 and jump table shadow area 444 are illustrated and expounded with reference to FIG. 5.

Figure 5:
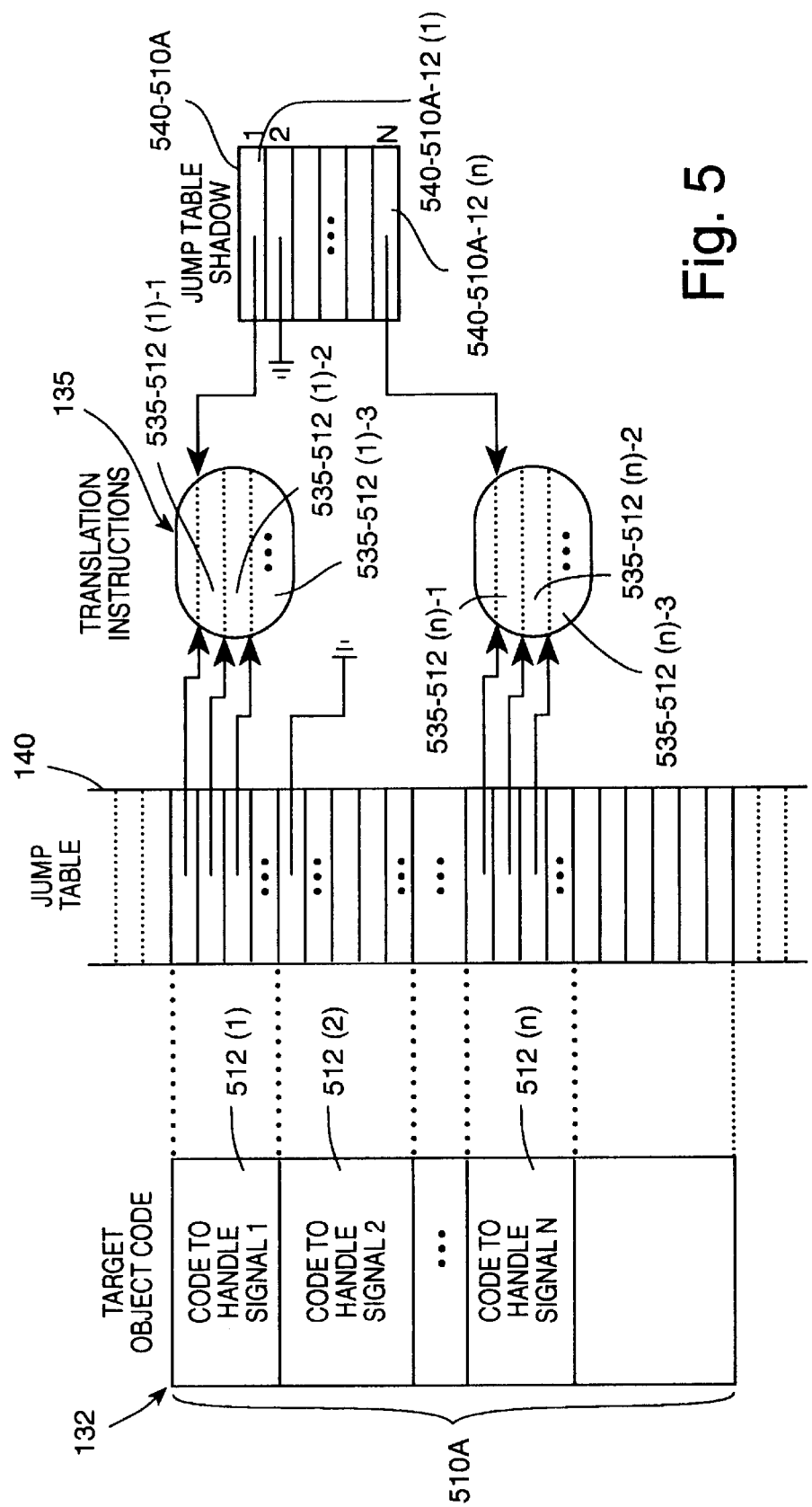
FIG. 5 is a diagrammatic view showing an interrelationship, according to the embodiment of FIG. 4, between a target object code area, a jump table, a translation instruction area, and a jump table shadow table.

Host system 410 of FIG. 4 is particularly adapted for target instructions which are grouped into blocks, with at least some of the blocks including signal-handling target instructions. For example, for simplification target object code area 132 of FIG. 5 is shown as having stored therein one block 510A. Composing block 510A are various target instructions, including a group 512(1) of target instructions for handling a first signal; a group 512(2) of target instructions for handling a second signal; and a group 512(n) of target instructions for handling a last signal. As explained previously, a "signal" is a message sent from one block of code to another. The signal comprises both a signal header and a signal body. The signal header includes an identifier of the sending block and the recipient block, as well as a signal number or type. The signal body includes data which is to be utilized by the recipient block in the execution of the signal. Thus, in the example shown in FIG. 5, block 510A can receive any one of the first through last signals, in which case block 510A must be complied and translated. In addition, block 510A can also generate signals which are sent to other blocks.

As understood from the foregoing, each target instruction in block 510A, including the signal-handling target instructions included in groups 512(1) through 512(n), have corresponding pointers stored in jump table 540, with those pointers in turn referencing addresses of sets of translating instructions in area 135. For example, group 512(1) has three target instructions, for which three corresponding pointers are stored in jump table 540. The pointers in jump table 540 reference sets 535-512(1)-1 through 535-512(1)-3, respectively, of translating instructions in area 135. Similarly, and as another example, the pointers in jump table 540 for the signal-handling target instructions included in group 512(n) address sets 535-512(n)-1 through 535-512(n)-3, respectively, of translating instructions in area 135.

FIG. 5 also shows that, for block 510A, a jump table shadow table 540-510A is included in jump table shadow area 444. Jump table shadow table 540-510A has entries for each of the signals which block 510A is expected to handle. In this regard, jump table shadow table 540-510A has entries 540-510A-12(1) through 540-510A-12(n) corresponding to groups 512(1) through 512(n) of signal-handling target instructions included in block 510A. Each entry in jump table shadow table 540-510A is a copy of the entry in jump table 440 corresponding to the first target instruction in the corresponding group of signal-handling target instructions. For example, the first entry in jump table shadow table 540-510A, which is an entry for the first signal, is a copy of the pointer in jump table 540 which points to address 535-512(1)-1 of area 135. Similarly, the last entry in jump table shadow table 540-510A, which is an entry for the last signal, is a copy of the pointer in jump table 540 which points to address 535-512(n)-1 of area 135.

Figure 6:
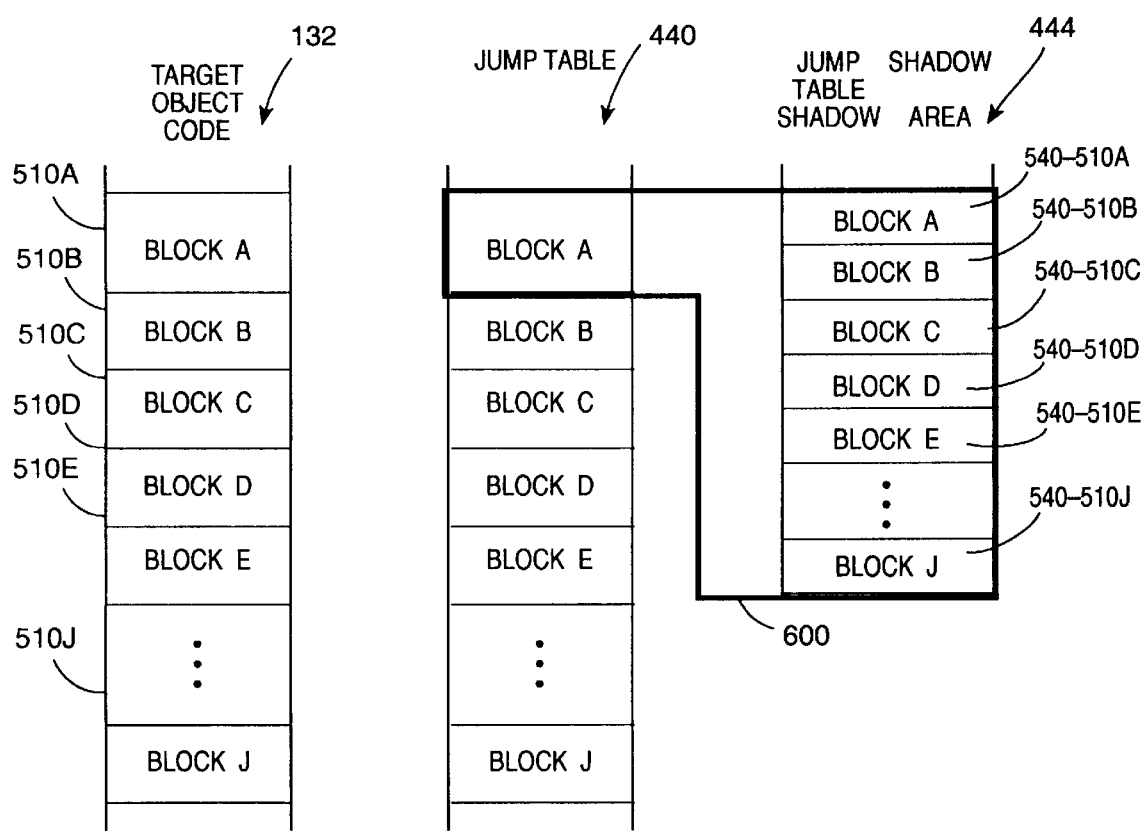
FIG. 6 is a diagrammatic view showing memory utilized for compilation of instructions necessary for translating a block in accordance with the embodiment of FIG. 4.

FIG. 6 shows the embodiment of FIG. 5, but with a plurality of blocks 510A, 510B, . . . 310J, each having a respective one of the jump table shadow tables 540-510A, 540-510B, . . . 540-510J. Thus, particularly with reference to the preceding discussion, it is understood that jump table shadow tables for each block 510A, 510B, . . . 310J, has entries for each signal handled by the respective block. In this regard, the number of entries in the jump table shadow table for any given block can be determined from the signal distribution table for that block.

FIG. 6 also shows compilation of code for translating a block of the target program. As understood from FIG. 6, host processor 112 need not have access to the entire jump table 440, but instead only so much of jump table 440 as is necessary for the block being translated, plus the jump table shadow tables for every other block for which signals are generated by the block being translated. Thus, in the example of FIG. 6 in which block 510A generates signals for each of blocks 510B–510N, host processor 112 need only have access to the memory areas framed by line 600 in FIG. 6.

Since host processor 112 does not need access to the entire jump table 440 of FIG. 4, it is understood that the remainder of jump table 440 can be stored elsewhere than in RAM 130. For example, the remainder of jump table 440 can be stored on a disk or the like, such as is handled by I/O storage device 120 or some other caching technique employed.

Figure 7:
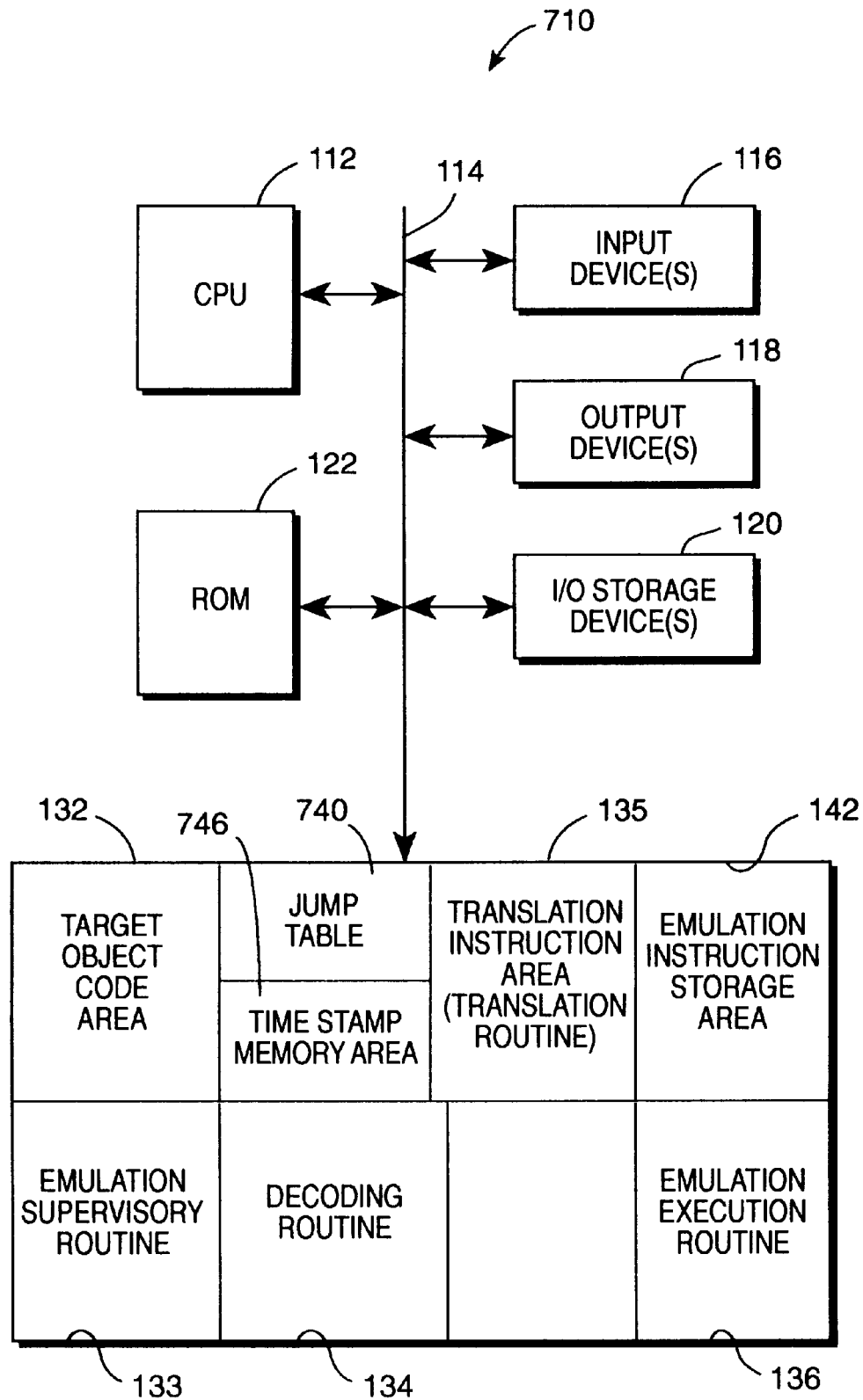
FIG. 7 is a schematic view of another embodiment of a host system according to the present invention, which embodiment reduces size of a jump table by utilization of a time-stamped compaction technique.

FIG. 7 illustrates another memory-saving embodiment of a host system 710, and particularly an embodiment utilizing compaction of data in jump table 740. Host system 710 of FIG. 7 resembles host system 110 above described with respect to FIG. 1, except as otherwise noted herein, e.g., by differently referenced consitituent elements. One primary difference between host system 710 and host system 110 is the provision in RAM 130 of host system 710 of a time stamp memory area 746. The utilization of time stamp memory area 746 in conjunction with compaction of data in jump table 740 is illustrated and expounded with reference to FIG. 8.

In FIG. 8, target object code area 732 has a plurality of blocks 710A through 710N. As in the foregoing embodiments, each target instruction of each block has a corresponding pointer in jump table 740. Although unillustrated in FIG. 8, it should be understood that the pointers in jump table 740 point to sets of translation instructions in like manner as described in connection with other embodiments described herein.

As shown in FIG. 8, block 710A has its set of pointers 740-10A in jump table 740, block 710B has its set of pointers 740-10B in jump table 740, and so forth continuing to block 710N. The sets of pointers in jump table 740 which are shown in broken lines are compacted, i.e., have packed data, while the sets of pointers in jump table 740 which are shown in solid lines are uncompacted.

As further shown in FIG. 8, each set of pointers 740-10A through 740-10N in jump table 740 has a time stamp stored in time stamp memory area 746. For example, set 74010A has a time stamp 746-10A; set 740-10B has a time stamp 746-10B; and so forth. For uncompacted sets, each time stamp indicates a relative time at which the set of pointers in jump table 740 was uncompacted. For example, time stamp 746-10B indicates that set 740-10B was uncompacted at time 1552; time stamp 746-10N indicates that set 740-10N was uncompacted at time 1554.

Thus, in the embodiment of FIG. 7, jump table 740 is split into segments, one for each block of the target program. These segments are packed and unpacked independently. When compiling code for a block, host processor 710 unfolds the associated segment in jump table 740 so that the standard immediate lookup mechanism is available for calculation of local branch destinations. When the execution thread leaves the current block, host processor 710 recompacts the associated segment in jump table 740.

Preferably, host processor 710 allows only a predetermined number, e.g., 20 to 50, of segments of jump table 740 to be unpacked simultaneously. As indicated above, these unpacked segments are time-stamped. The least-recently used segment of jump table 740, as determined from the time stamp memory area 746, is packed when the need for unpacking a new segment arises. Preferably, only a small number of blocks will be active most of the time, so the embodiment of FIG. 7 in such cases provides a good trade-off between time and memory requirements.

Another aspect which may optionally, and preferably, be incorporated into the present embodiments of the invention is an incremental compiler used as an intermediate step in the translation of code from the target code to the emulation code. The function pointers between the target code and the emulation code can be initially defined by references to functions for decoding the target instructions and generating the emulation instructions. In this way, changes to the target computer system can be accommodated in the translation by updating the table references that are consulted during the translation steps.

Figure 10:
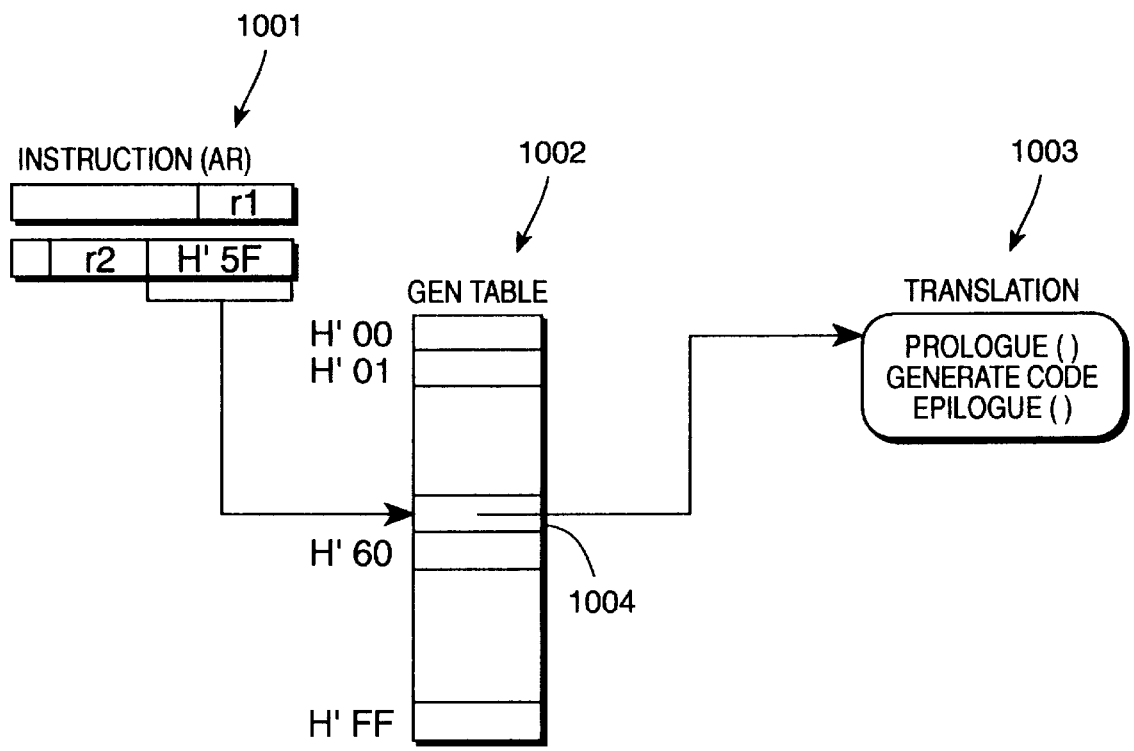
FIG. 10 is a diagrammatic view of the interrelationships between a modified target instruction, a intermediary generation table, and the translation into emulation code.

That is, instead of a translation that simply decodes target instructions and generates corresponding simulation code, the example embodiment of FIG. 10 employs translation step 1003, which pulls its target instructions from generation table 1002 and performs "prologue" and "epilogue" routines respectively before and after the actual emulation code generation. These routines are described in greater detail below.

The example of FIG. 10 shows an add register instruction being decoded and re-generated as emulation code. The code conversion process begins by reading the target instruction 1001. In this case, the target instruction is an add register instruction from "r1" to "r2" at location H'5F. This instruction is loaded in generation table 1002 at location 1004, thus updating generation table 1002 to accommodate the new instruction step in the emulation code generation routines.

Translation step 1003 then pulls the change instruction from 1004, executes 1) the prologue routine, 2) the emulation code generation routine, and 3) the epilogue routine.

The prologue routine is called before the code generation routine in order to ensure that sufficient space is available in the host code buffer area, and in order to update the jump table pointers (for example, 140).

The epilogue routine is called after the code generation to perform several functions. First, the epilogue routine may monitor and execute time-outs for simulation routines, after a certain number of execution cycles have occurred. Also, appropriate handling of delayed signals (by, for example, job buffers) can occur in the epilogue routine. The epilogue routine also can monitor the number of executed instructions made in a simulation cycle for comparison to a threshold. Also, the epilogue routine will update a program counter by adding the size of the just-executed instruction to it. In this way, the epilogue routine insures that the program counter is maintained current at any translation occurrence.

In accordance with yet another example embodiment of the invention. The memory for host computer to store the emulation code is allocated in appropriate chunks by the host computer, as simulated target instructions are written to it. In addition, the host computer can simulate memory allocation that would be used by the target computer executing the target instructions.

While the invention has been particularly shown and described with reference to the preferred embodiments thereof, it will be understood by those skilled in the art that various alterations in form and detail may be made therein without departing from the spirit and scope of the invention.

The embodiments of the invention in which an exclusive property or privilege is claimed are defined as follows:

1. An instruction emulation system which translates target instructions into emulation instructions, the system comprising:

a host processor which executes instructions formatted in accordance with a host processor instruction set;

a target instruction memory in which the target instructions are stored, the target instruction memory having target instructions of differing types, the target instructions stored in the target instruction memory having non-uniform instruction length including a shortest target instruction length;

an translation instruction memory, the translation instruction memory having sets of translating instructions for generating emulation instructions for each of the differing types of target instructions, the sets of translating instructions being formatted in accordance with the host processor instruction set, the emulation instructions also being formatted in accordance with the host processor instruction set, the emulation instructions generated for a particular target instruction being structured to accomplish a same activity as the particular target instruction for which it is generated;

a jump table memory having a plurality of entries, each of the plurality of entries in the jump table having an entry length which is no greater than the shortest target instruction length, a selected target instruction in the target instruction memory having associated therewith a selected entry in the jump table memory, the selected entry in the jump table memory having stored therein a pointer to a specific one of the sets of translation instructions in the translation instruction memory.

2. An instruction emulation system which translates target instructions into emulation instructions, the system comprising:

a host processor which executes instructions formatted in accordance with a host processor instruction set;

a target instruction memory in which the target instructions are stored, the target instructions being grouped into a plurality of blocks, at least some of the blocks having both a signal handing target instruction and a non-signal handling target instruction;

an translation instruction memory, the translation instruction memory having sets of translating instructions for generating emulation instructions for the target instructions, the sets of translating instructions being formatted in accordance with the host processor instruction set, the emulation instructions generated for a particular target instruction being structured to accomplish a same activity as the particular target instruction for which it is generated;

a jump table memory having stored therein a plurality of entries, a selected target instruction in the target instruction memory having associated therewith a selected entry in the jump table memory, the selected entry in the jump table memory having stored therein a pointer to a specific one of the sets of translation instructions in the translation instruction memory;

a jump table shadow memory having a plurality of jump table shadow tables, each jump table shadow table being paired with one of the plurality of blocks having a signal handing target instruction, each jump table shadow table having stored therein a copy of a jump table entry associated with the signal handling target instruction included the block with which the jump table entry table is paired;

wherein, in compiling a designated block of target instructions, the host processor compiles a portion of the jump table which corresponds to the designated block and the jump table shadow table for any other block invoked by a signal generated by the designated block.

3. An instruction emulation system which translates target instructions into emulation instructions, the system comprising:

a host processor which executes instructions formatted in accordance with a host processor instruction set;

a target instruction memory in which the target instructions are stored, the target instructions being grouped into a plurality of blocks;

an translation instruction memory, the translation instruction memory having sets of translating instructions for generating emulation instructions for each of the target instructions;

a jump table memory having a plurality of entries, a selected target instruction in the target instruction memory having associated therewith a selected entry in the jump table memory, the selected entry in the jump table memory having stored therein a pointer to a specific one of the sets of translation instructions in the translation instruction memory;

wherein the jump table memory is partitioned into segments corresponding to the blocks stored in the target instruction memory, and wherein selected ones of the segments of the jump table memory are uncompacted in accordance with a recent utilization criteria and non-selected ones of the segments are compacted.

4. A method of using a host processor to simulate a target processor, the method comprising:

fetching, from a target instruction memory, target instructions coded in accordance with an instruction set of the target processor;

decoding the target instructions;

translating the target instructions into emulation instructions, the emulation instructions being formatted in accordance with an instruction set of the host processor;

executing the emulation instructions using the host processor;

wherein the fetching, decoding, translating, and executing steps are performed coordinated in pipeline fashion;

wherein the step of translating the emulating instructions includes storing the emulation instructions in an emulation instruction area of a memory, wherein the step of executing the emulation instructions includes obtaining the emulation instructions from the memory, and wherein the method further comprises:
making a determination when more emulation instructions are needed for execution by the host processor, and
in response to the determination, interrupting the decoding and translating of the target instructions in order to fetch more target instructions.

5. A method of using a host processor to simulate a target processor, the method comprising:

fetching, from a target instruction memory, target instructions coded in accordance with an instruction set of the target processor;

decoding the target instructions;

translating the target instructions into emulation instructions, the emulation instructions being formatted in accordance with an instruction set of the host processor;

executing the emulation instructions using the host processor;

wherein the fetching, decoding, translating, and executing steps are performed coordinated in pipeline fashion;

wherein the target instruction memory has target instructions of differing types, the target instructions stored in the target instruction memory having non-uniform instruction length including a shortest target instruction length;

executing a translation routine to perform the step of translating the target instructions into emulation instructions, the translation routing comprising translation instructions stored in a translation instruction memory, the translation instruction memory having sets of translating instructions for generating emulation instructions for each of the differing types of target instructions, the sets of translating instructions being formatted in accordance with the host processor instruction set, the emulation instructions generated for a particular target instruction being structured to accomplish a same activity as the particular target instruction for which it is generated; and providing a jump table memory having a plurality of entries, each of the plurality of entries in the jump table having an entry length which is no greater than the shortest target instruction length, a selected target instruction in the target instruction memory having associated therewith a selected entry in the jump table memory, the selected entry in the jump table memory having stored therein a pointer to a specific one of the sets of translation instructions in the translation instruction memory.

6. A method of using a host processor to simulate a target processor, the method comprising:

fetching, from a target instruction memory, target instructions coded in accordance with an instruction set of the target processor;

decoding the target instructions;

translating the target instructions into emulation instructions, the emulation instructions being formatted in accordance with an instruction set of the host processor;

executing the emulation instructions using the host processor;

wherein the fetching, decoding, translating, and executing steps are performed coordinated in pipeline fashion;

grouping the target instructions being grouped into a plurality of blocks, at least some of the blocks having both a signal handing target instruction and a non-signal handling target instruction;

executing a translation routine to perform the step of translating the target instructions into emulation instructions, the translation routing comprising sets of translation instructions stored in a translation instruction memory for generating emulation instructions for each of the differing types of target instructions, the sets of translating instructions being formatted in accordance with the host processor instruction set, the emulation instructions generated for a particular target instruction being structured to accomplish a same activity as the particular target instruction for which it is generated;

providing a jump table memory having stored therein a plurality of entries, a selected target instruction in the target instruction memory having associated therewith a selected entry in the jump table memory, the selected entry in the jump table memory having stored therein a pointer to a specific one of the sets of translation instructions in the translation instruction memory;

providing a jump table shadow memory having a plurality of, jump table shadow tables, each jump table shadow table being paired with one of the plurality of blocks having a signal handing target instruction, each jump table shadow table having stored therein a copy of a jump table entry associated with the signal handling target instruction included the block with which the jump table entry table is paired;

wherein, in compiling a designated block of target instructions, the host processor compiles a portion of the jump table which corresponds to the designated block and the jump table shadow table for any other block invoked by a signal generated by the designated block.

7. A method of using a host processor to simulate a target processor, the method comprising:

fetching, from a target instruction memory, target instructions coded in accordance with an instruction set of the target processor;

decoding the target instructions;

translating the target instructions into emulation instructions, the emulation instructions being formatted in accordance with an instruction set of the host processor;

executing the emulation instructions using the host processor;

wherein the fetching, decoding, translating, and executing steps are performed coordinated in pipeline fashion;

grouping the target instructions being grouped into a plurality of blocks;

executing a translation routine to perform the step of translating the target instructions into emulation instructions, the translation routing comprising sets of translation instructions stored in a translation instruction memory, providing a jump table memory having a plurality of entries, a selected target instruction in the target instruction memory having associated therewith a selected entry in the jump table memory, the selected entry in the jump table memory having stored therein a pointer to a specific one of the sets of translation instructions in the translation instruction memory;

partitioning the jump table memory into segments corresponding to the blocks stored in the target instruction memory; and uncompacting selected ones of the segments of the jump table memory are in accordance with a recent utilization criteria with non-selected ones of the segments being compacted.

8. An instruction emulation system comprising:

a target instruction memory for storing target instructions coded in accordance with an instruction set of the target processor;

a host processor which performs the following in coordinated pipeline fashion:
 (1) decoding the target instructions;
 (2) translating the target instructions into emulation instructions, the emulation instructions being formatted in accordance with an instruction set of the host processor;
 (3) executing the emulation instructions;

an emulation instruction area of a memory;

wherein in translating the emulating instructions the host processor stores the emulation instructions in an emulation instruction area of a memory, wherein the executing of the emulation instructions includes obtaining the emulation instructions from the emulation instruction area of memory, and wherein the host processor makes a determination when more emulation instructions are needed for execution by the host processor and, in response to the determination, interrupts the decoding and translating of the target instructions in order to fetch more target instructions.

9. An instruction emulation system comprising:

a target instruction memory for storing target instructions coded in accordance with an instruction set of the target processor;

a host processor which performs the following in coordinated pipeline fashion:
 (1) decoding the target instructions;
 (2) translating the target instructions into emulation instructions, the emulation instructions being formatted in accordance with an instruction set of the host processor;
 (3) executing the emulation instructions;

wherein the target instruction memory has target instructions of differing types, the target instructions stored in the target instruction memory having non-uniform instruction length including a shortest target instruction length;

wherein the host processor executes a translation routine to perform the translating of the target instructions into emulation instructions, the translation routing comprising translation instructions stored in a translation instruction memory, the translation instruction memory having sets of translating instructions for generating emulation instructions for each of the differing types of target instructions, the sets of translating instructions being formatted in accordance with the host processor instruction set, the emulation instructions generated for a particular target instruction being structured to accomplish a same activity as the particular target instruction for which it is generated; and a jump table memory having a plurality of entries, each of the plurality of entries in the jump table having an entry length which is no greater than the shortest target instruction length, a selected target instruction in the target instruction memory having associated therewith a selected entry in the jump table memory, the selected entry in the jump table memory having stored therein a pointer to a specific one of the sets of translation instructions in the translation instruction memory.

10. An instruction emulation system comprising:

a target instruction memory for storing target instructions coded in accordance with an instruction set of the target processor;

a host processor which performs the following in coordinated pipeline fashion:
  (1) decoding the target instructions;
  (2) translating the target instructions into emulation instructions, the emulation instructions being formatted in accordance with an instruction set of the host processor;
  (3) executing the emulation instructions;

wherein the target instructions are grouped into a plurality of blocks, at least some of the blocks having both a signal handing target instruction and a non-signal handling target instruction;

wherein the host processor executes a translation routine to perform the translating of the target instructions into emulation instructions, the translation routing comprising sets of translation instructions stored in a translation instruction memory for generating emulation instructions for each of the differing types of target instructions, the sets of translating instructions being formatted in accordance with the host processor instruction set, the emulation instructions generated for a particular target instruction being structured to accomplish a same activity as the particular target instruction for which it is generated;

a jump table memory having stored therein a plurality of entries, a selected target instruction in the target instruction memory having associated therewith a selected entry in the jump table memory, the selected entry in the jump table memory having stored therein a pointer to a specific one of the sets of translation instructions in the translation instruction memory;

a jump table shadow memory having a plurality of jump table shadow tables, each jump table shadow table being paired with one of the plurality of blocks having a signal handing target instruction, each jump table shadow table having stored therein a copy of a jump table entry associated with the signal handling target instruction included the block with which the jump table entry table is paired;

wherein, in compiling a designated block of target instructions, the host processor compiles a portion of the jump table which corresponds to the designated block and the jump table shadow table for any other block invoked by a signal generated by the designated block.

11. An instruction emulation system comprising:

a target instruction memory for storing target instructions coded in accordance with an instruction set of the target processor;

a host processor which performs the following in coordinated pipeline fashion:
  (1) decoding the target instructions;
  (2) translating the target instructions into emulation instructions, the emulation instructions being formatted in accordance with an instruction set of the host processor;
  (3) executing the emulation instructions;

wherein the target instructions are grouped in the target instruction memory into a plurality of blocks;

wherein the host processor executes a translation routine to perform the translating of the target instructions into emulation instructions, the translation routing comprising sets of translation instructions stored in a translation instruction memory;

a jump table memory having a plurality of entries, a selected target instruction in the target instruction memory having associated therewith a selected entry in the jump table memory, the selected entry in the jump table memory having stored therein a pointer to a specific one of the sets of translation instructions in the translation instruction memory;

wherein the jump table memory is partitioned into segments corresponding to the blocks stored in the target instruction memory, and wherein selected ones of the segments of the jump table memory are uncompacted in accordance with a recent utilization criteria and non-selected ones of the segments are compacted.

12. A computer software product including emulation supervisory routine instructions stored in a memory for execution by a host processor to simulate a target processor, the emulation supervisory routine performing the following steps:

fetching, from a target instruction memory, target instructions coded in accordance with an instruction set of the target processor;

decoding the target instructions;

translating the target instructions into emulation instructions, the emulation instructions being formatted in accordance with an instruction set of the host processor;

executing the emulation instructions using the host processor;

wherein the step of translating the emulating instructions includes storing the emulation instructions in an emulation instruction area of a memory;

wherein the step of executing the emulation instructions includes obtaining the emulation instructions from the memory, making a determination when more emulation instructions are needed for execution by the host processor, and in response to the determination, interrupting the decoding and translating of the target instructions in order to fetch more target instructions.

13. A computer software product including emulation supervisory routine instructions stored in a memory for execution by a host processor to simulate a target processor, the emulation supervisory routine performing the following steps:

fetching, from a target instruction memory, target instructions coded in accordance with an instruction set of the target processor;

decoding the target instructions;

translating the target instructions into emulation instructions, the emulation instructions being formatted in accordance with an instruction set of the host processor;

executing the emulation instructions using the host processor; wherein the target instruction memory has target instructions of differing types, the target instructions stored in the target instruction memory having non-uniform instruction length including a shortest target instruction length;

executing a translation routine to perform the step of translating the target instructions into emulation instructions, the translation routing comprising translation instructions stored in a translation instruction memory, the translation instruction memory having sets of translating instructions for generating emulation instructions for each of the differing types of target instructions, the sets of translating instructions being formatted in accordance with the host processor instruction set, the emulation instructions generated for a particular target instruction being structured to accomplish a same activity as the particular target instruction for which it is generated; and administering a jump table memory having a plurality of entries, each of the plurality of entries in the jump table having an entry length which is no greater than the shortest target instruction length, a selected target instruction in the target instruction memory having associated therewith a selected entry in the jump table memory, the selected entry in the jump table memory having stored therein a pointer to a specific one of the sets of translation instructions in the translation instruction memory.

14. A computer software product including emulation supervisory routine instructions stored in a memory for execution by a host processor to simulate a target processor, the emulation supervisory routine performing the following steps:

fetching, from a target instruction memory, target instructions coded in accordance with an instruction set of the target processor;

decoding the target instructions;

translating the target instructions into emulation instructions, the emulation instructions being formatted in accordance with an instruction set of the host processor;

executing the emulation instructions using the host processor;

wherein the steps coordinated further comprise:

grouping the target instructions being grouped into a plurality of blocks, at least some of the blocks having both a signal handing target instruction and a non-signal handling target instruction;

executing a translation routine to perform the step of translating the target instructions into emulation instructions, the translation routing comprising sets of translation instructions stored in a translation instruction memory for generating emulation instructions for each of the differing types of target instructions, the sets of translating instructions being formatted in accordance with the host processor instruction set, the emulation instructions generated for a particular target instruction being structured to accomplish a same activity as the particular target instruction for which it is generated;

administering a jump table memory having stored therein a plurality of entries, a selected target instruction in the target instruction memory having associated therewith a selected entry in the jump table memory, the selected entry in the jump table memory having stored therein a pointer to a specific one of the sets of translation instructions in the translation instruction memory;

administering a jump table shadow memory having a plurality of jump table shadow tables, each jump table shadow table being paired with one of the plurality of blocks having a signal handing target instruction, each jump table shadow table having stored therein a copy of a jump table entry associated with the signal handling target instruction included the block with which the jump table entry table is paired;

wherein, in compiling a designated block of target instructions, the host processor compiles a portion of the jump table which corresponds to the designated block and the jump table shadow table for any other block invoked by a signal generated by the designated block.

15. A computer software product including emulation supervisory routine instructions stored in a memory for execution by a host processor to simulate a target processor, the emulation supervisory routine performing the following steps:

fetching, from a target instruction memory, target instructions coded in accordance with an instruction set of the target processor;

decoding the target instructions;

translating the target instructions into emulation instructions, the emulation instructions being formatted in accordance with an instruction set of the host processor;

executing the emulation instructions using the host processor;

wherein the steps coordinated further comprise:

grouping the target instructions being grouped into a plurality of blocks;

executing a translation routine to perform the step of translating the target instructions into emulation instructions, the translation routing comprising sets of translation instructions stored in a translation instruction memory, administering a jump table memory having a plurality of entries, a selected target instruction in the target instruction memory having associated therewith a selected entry in the jump table memory, the selected entry in the jump table memory having stored therein a pointer to a specific one of the sets of translation instructions in the translation instruction memory;

partitioning the jump table memory into segments corresponding to the blocks stored in the target instruction memory; and uncompacting selected ones of the segments of the jump table memory are in accordance with a recent utilization criteria with non-selected ones of the segments being compacted.

* * * * *